(12) United States Patent
Cuenot

(10) Patent No.: US 11,646,789 B2
(45) Date of Patent: May 9, 2023

(54) OPTICAL TIME-DOMAIN REFLECTOMETER (OTDR)-BASED HIGH REFLECTIVE EVENT MEASUREMENT

(71) Applicant: VIAVI SOLUTIONS INC., San Jose, CA (US)

(72) Inventor: Benjamin Cuenot, Saint-Priest-en-Jarez (FR)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 17/580,430

(22) Filed: Jan. 20, 2022

(65) Prior Publication Data

US 2023/0073872 A1    Mar. 9, 2023

(51) Int. Cl.
*H04B 10/071* (2013.01)
*H04B 10/67* (2013.01)

(52) U.S. Cl.
CPC ......... *H04B 10/071* (2013.01); *H04B 10/674* (2013.01)

(58) Field of Classification Search
None
See application file for complete search history.

(56) References Cited

U.S. PATENT DOCUMENTS

| 10,432,306 B2 | 10/2019 | Eiselt |
| 2004/0165813 A1 | 8/2004 | Kouns |

| 2007/0115456 A1* | 5/2007 | Wisseman | H04B 10/00 356/73.1 |
| 2011/0222854 A1* | 9/2011 | Roberts | H04B 10/532 398/70 |
| 2011/0255860 A1* | 10/2011 | Lee | G01M 11/3136 398/10 |
| 2012/0045205 A1* | 2/2012 | Perron | H04B 10/0795 398/48 |
| 2017/0019168 A1* | 1/2017 | Menard | H04J 14/0212 |
| 2019/0280767 A1* | 9/2019 | Haber | G01M 11/3127 |
| 2021/0048369 A1* | 2/2021 | Noguchi | G01M 11/3136 |

FOREIGN PATENT DOCUMENTS

| CN | 112713931 A * | 4/2021 | G01B 11/02 |
| EP | 2264420 A1 | 12/2010 | |

OTHER PUBLICATIONS

Martins entitled "Coherent Noise Reduction in High Visibility Phase-Sensitive Optical Time Domain Reflectometer for Distributed Sensing of Ultrasonic Waves" Journal of Lightwave Technology, vol. 31, No. 23, Dec. 1, 2013 (Year: 2013).*

(Continued)

*Primary Examiner* — Darren E Wolf
(74) *Attorney, Agent, or Firm* — Mannava & Kang, P.C.

(57) ABSTRACT

In some examples, an optical time-domain reflectometer (OTDR)-based high reflective event measurement system may include an OTDR, and an N by M optical switch optically connected to the OTDR or disposed within the OTDR. The optical switch may include a variable attenuator mode and at least one optical fiber connected to at least one output port of the optical switch. At least one fiber optic reflector may be disposed at an end of the at least one optical fiber. A variable optical attenuator may reduce, for the at least one optical fiber including the at least one fiber optic reflector, an amplitude of reflective peaks.

20 Claims, 15 Drawing Sheets

(56) References Cited

OTHER PUBLICATIONS

Kobayashi entitled "Polarization-Independent Interferometric Optical-Time-Domain Reflectometer" Journal of Lightwave Technology. vol. 9, No. 5, May 1991 (Year: 1991).*
Jean Ponchon et al., "PON Test Systems—From theory to field deployments", JDSU France, 2011, (3 pages).
Telcordia, "Key OTDR Specification Relates to User's Real Needs". EDN, Dec. 1, 1999, (6 pages).
EPO, "The extended European search report for European application No. 22186469.7", dated Jan. 5, 2023, 10 pages.
Swook Hann et al., "Monitoring techniques for a hybrid PS/WDM-PON by using a tunable OTDR and FBGs: Monitoring techniques for a hybrid PS/WDM-PON", Measurement Science and Technology, IOP Bristol, GB, vol. 17, No. 5, May 1, 2006, pp. 1070-1074.

* cited by examiner

OPTICAL TIME-DOMAIN REFLECTOMETER (OTDR)-BASED HIGH REFLECTIVE EVENT MEASUREMENT

PRIORITY

The present application claims priority under 35 U.S.C. 119(a)-(d) to European patent application number 21306206.0, having a filing date of Sep. 3, 2021, the disclosure of which is hereby incorporated by reference in its entirety.

BACKGROUND

A fiber optic cable may include one or more optical fibers that may be used to transmit light from a source to a destination. The optical fibers of the fiber optic cable may be referred to as fiber optic links. Fiber optic cables may represent a network element of a fiber optic network. In this regard, other types of network elements may include optical connectors, optical splices, optical couplers, and optical switches. Testing the fiber optic link may be needed, for example, for optical fiber installation, optical fiber construction, validation, monitoring and maintenance.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1A:
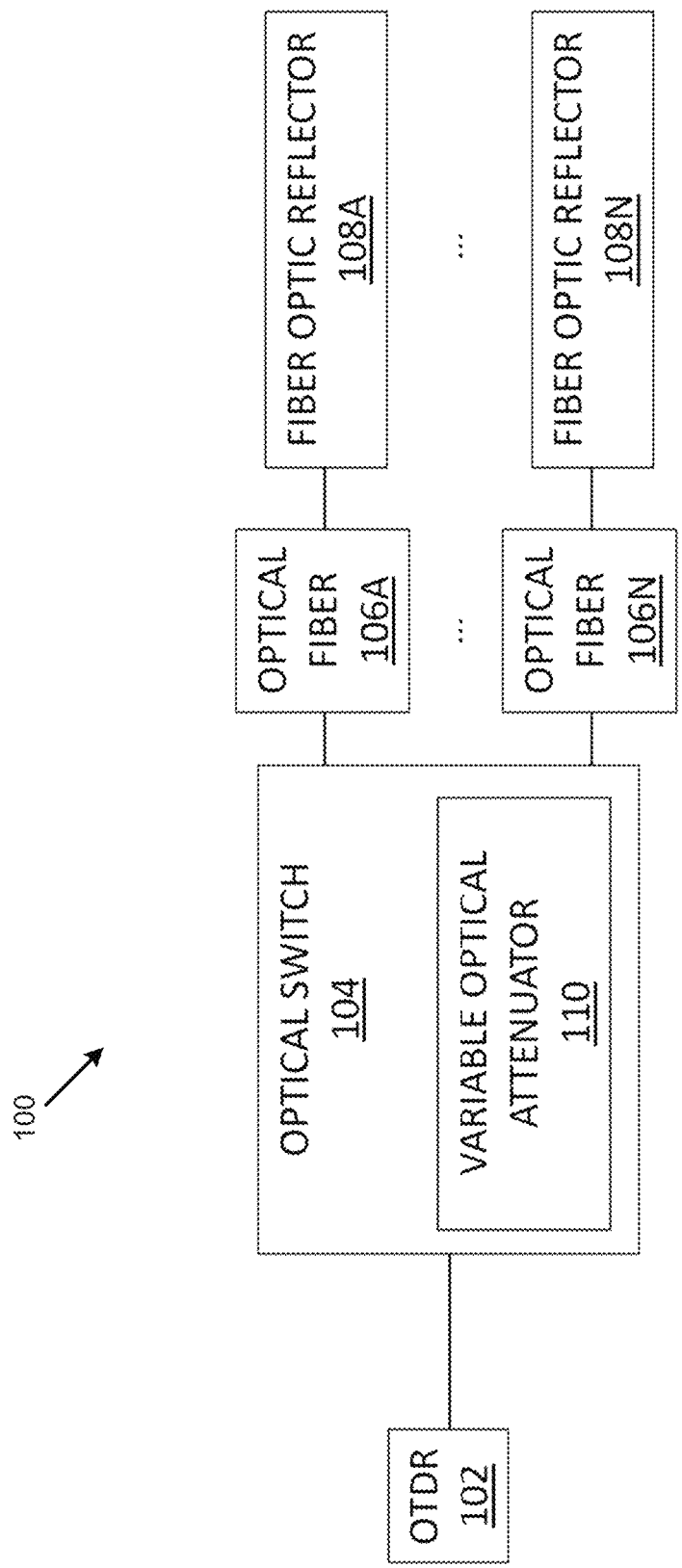
FIG. 1A illustrates an architecture of an OTDR-based high reflective event measurement system, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples of the present disclosure, an optical time domain reflectometer (OTDR)-based high reflective event measurement system may utilize an optical switch to perform the combined functions of direct switching from one passive optical networks (PON) port to another, and the attenuation function required for the interrogation of reflective optical markers. In this regard, the systems and methods disclosed herein may obtain a correct measurement of a splitter insertion loss even in the case of a low-loss splitter through calibrated attenuation of a signal.

An OTDR may be utilized for amplitude and distance characterization of optical losses and reflections. In the context of testing networks with a strong link budget such as PONs, the measurement dynamics of optical reflectometers may be insufficient to access the backscattering level. Moreover, the use of in-line reflective components (e.g., reflectors, reflective markers, etc.) in a network may be used to perform measurements based on a peak of the reflection signals which may be above a backscatter level.

These optical reflectors may generate a reference signal which is compared to a reference amplitude taken upstream. The difference in level between the top of the reflective peak and the reference value may be used to follow the evolution of the insertion loss between the reference point and the distance location where the reflector is placed. The reflectance of markers may be defined around a compromise to generate a reflective event which emerges sufficiently from the OTDR noise floor without saturating the reception stage of the OTDR. The level of power reflected by a reflector towards the OTDR depends on its reflectance. A reflectance that is too high may return a relatively high power and saturate the input of the OTDR which will no longer be able to measure the exact level. Alternatively, a reflectance that is too low will generate a reflected signal below or very close to the OTDR noise floor, which will not allow the detection or correct detection of the signal reflected by the reflector. In certain cases such as that of PON networks which can use passive optical couplers of very different splitting ratios, it is technically challenging to determine a reflectance value of the marker which satisfies all configurations.

For example, in the case of a low loss splitter, a high peak value due to reflector return loss may be combined with a low-loss of the splitter. Due to OTDR saturation, it is technically challenging to measure the peak value with adequate accuracy.

The systems and methods disclosed herein address at least the aforementioned technical challenges by utilizing calibrated attenuation of a micro-electromechanical systems (MEMS) switch (either in an OTDR product or outside an OTDR product), for reducing and measuring the peak value accurately. Such calibrated attenuation may be implemented using MEMs switches technology.

The systems and methods disclosed herein may utilize optical switches with MEMs technology for insertion loss measurement of a low-loss splitter.

According to examples disclosed herein, the OTDR-based high reflective event measurement system may include an OTDR, an N by M optical switch with a variable attenuator mode, and at least one fiber optic reflector. The OTDR-based high reflective event measurement system may further include a variable optical fiber attenuator process to reduce the amplitude of the reflective peaks to leave the zone of saturation in amplitude of the OTDR. In this regard, the input level of an OTDR may have a maximum limit of optical input power to stay in the linear mode of operation. Beyond this limit, the optical signal may gradually saturate the reception stage of the OTDR, which may not be able to correctly measure the amplitude of the signal.

According to examples disclosed herein, the OTDR-based high reflective event measurement system may include an OTDR, and an N by M optical switch optically connected to the OTDR or disposed within the OTDR. The optical switch may include a variable attenuator mode and at least one optical fiber connected to at least one output port of the optical switch. At least one fiber optic reflector may be disposed at an end of the at least one optical fiber. A variable optical attenuator may reduce, for the at least one optical fiber including the at least one fiber optic reflector, an amplitude of reflective peaks.

According to examples disclosed herein, for the OTDR-based high reflective event measurement system disclosed herein, the optical switch may be based on MEMS technology or on electro-mechanical technology.

According to examples disclosed herein, for the OTDR-based high reflective event measurement system disclosed herein, the network under test include a PON, or a point to point fiber optic network.

According to examples disclosed herein, for the OTDR-based high reflective event measurement system disclosed herein, the optical power at output ports may be monitored by a tap photodiode.

According to examples disclosed herein, for the OTDR-based high reflective event measurement system disclosed herein, for the N by M optical switch (e.g., 1 by 32 optical switch), N is one.

According to examples disclosed herein, for the OTDR-based high reflective event measurement system disclosed herein, for the N by M optical switch (e.g., 2 by 1 optical switch), M is one. In this regard, the optical switch may be used either to reduce power in a configuration with multiple lasers or receivers as disclosed herein.

According to examples disclosed herein, for the OTDR-based high reflective event measurement system disclosed herein, for the N by M optical switch (e.g., 2 by 4 optical switch), N and M are greater than one.

Operations associated with the OTDR-based high reflective event measurement system disclosed herein are described with reference to FIGS. 4 to 8.

Figure 4:
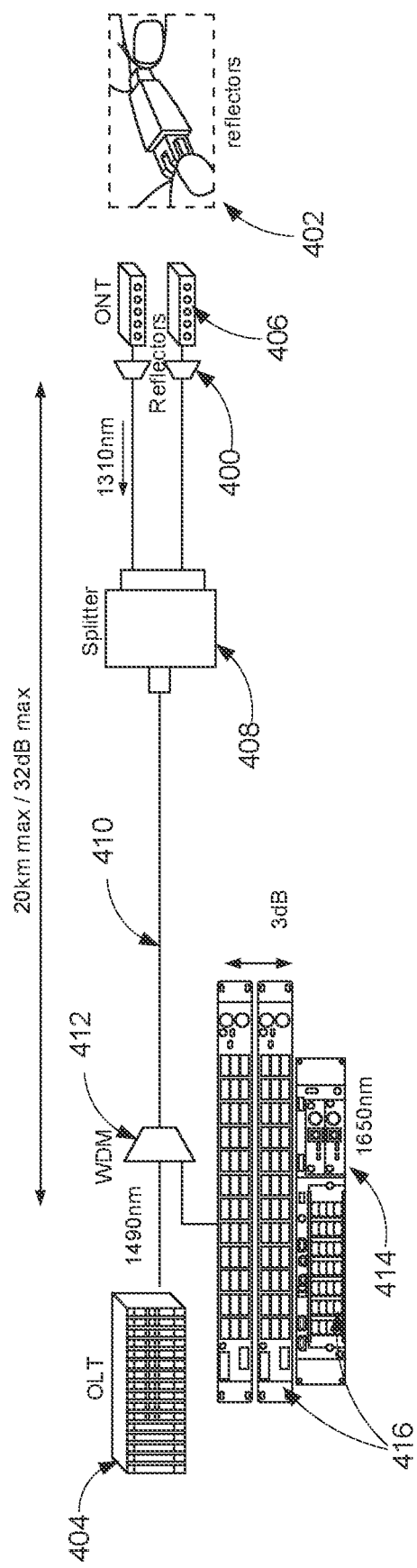
FIG. 4 illustrates optical reflectors for measuring insertion loss on Passive Optical Networks (PONs), according to an example of the present disclosure.

FIG. 4 illustrates optical reflectors for measuring insertion loss on PONs, according to an example of the present disclosure.

Referring to FIG. 4, with respect to OTDRs generally, a typical use case of optical reflectors 400 and 402 for measuring insertion loss on PON networks is shown. The PON telecommunications equipment may include, upstream of the network, one optical line terminal (OLT) 404, and on the subscribers side, a plurality of optical network terminals ONTs 406. The physical passive connection between OLT 404 and ONTs 406 may include an optical splitter 408 to distribute the signal from fiber feeder 410 to different clients (e.g., ONTs 406). For reflectometric measurement purposes, a wavelength multiplexer 412 may be utilized to insert the test signal originating from the OTDR 414. While FIG. 4 represents a single PON, the use of optical switches 416 makes it possible to sequentially test several PONs in time sharing mode. Optical reflectors 400 and 402 may be placed in front of the ONTs 406 as shown in FIG. 4. In this regard, if the measurement dynamics of the OTDR 414 are not sufficient to access the Rayleigh backscatter signal downstream of the optical splitter 408, the measurement on the peak of the reflection signals generated by the optical reflectors 400 and 402 (e.g., markers) allows for the indirect measurement of the loss down to the ONTs 406.

Figure 5A:
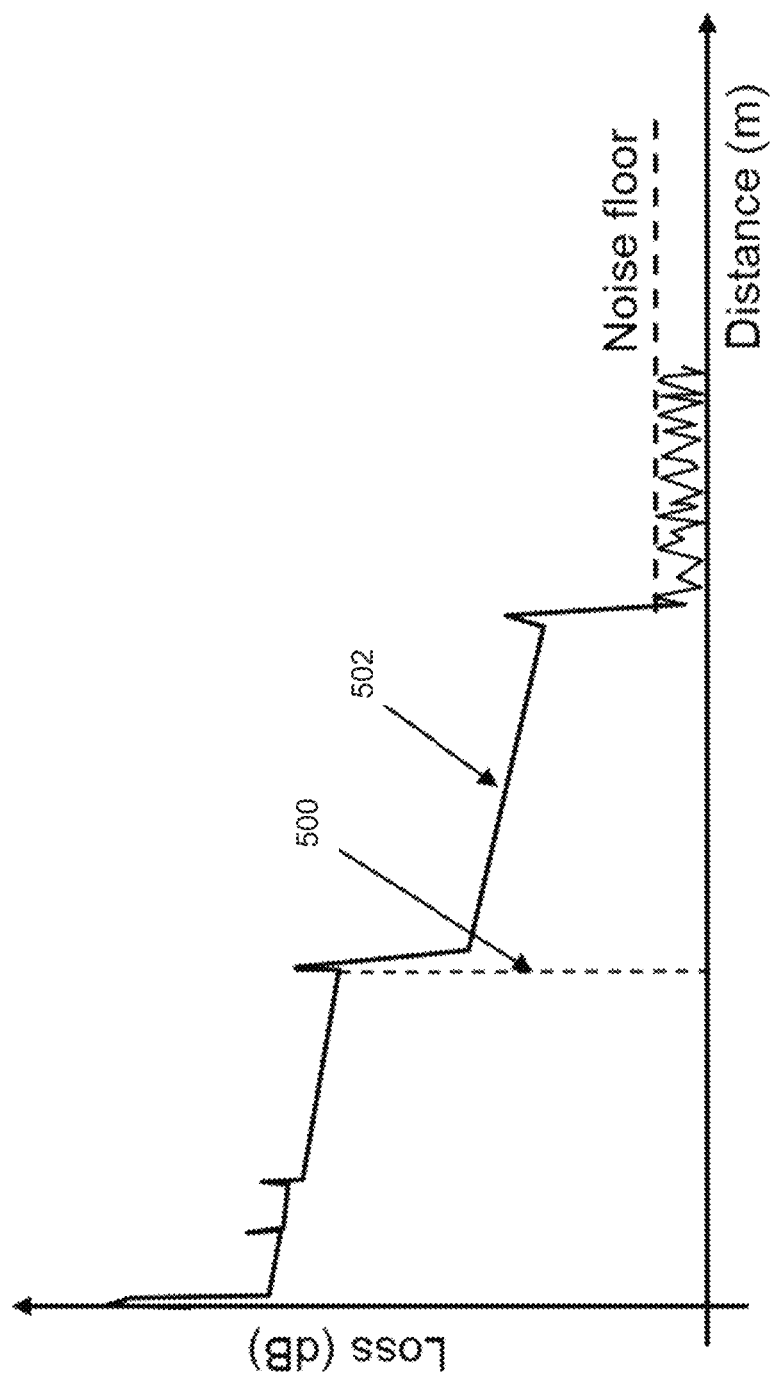
FIG. 5A illustrates an OTDR trace with a measurement dynamic sufficient to have access to a level of backscattering downstream of an optical splitter location, according to an example of the present disclosure.

FIG. 5A illustrates an OTDR trace with a measurement dynamic sufficient to have access to a level of backscattering downstream of an optical splitter location, according to an example of the present disclosure.

Specifically, FIG. 5A illustrates an OTDR trace with a measurement dynamic sufficient to have access to the level of backscattering downstream of the optical splitter location 500 with a signal-to-noise ratio allowing direct measurement of the insertion loss after the splitter location (e.g., splitter insertion loss, or OLT to ONT link budget). Thus, FIG. 5A shows an OTDR trace corresponding to a measurement for which the OTDR has sufficient measurement dynamic range to measure the optical losses beyond the location 500 of the coupler (e.g., at 502). In such a case, the OTDR may access the backscatter level all along the fiber link length, and it may not be needed to add an in-line reflector by indirectly measuring the optical losses. For the example of FIG. 5A, the OTDR trace has been simplified, whereas in reality (e.g., for an actual OTDR trace), each branch connected to an ONT may make its own contribution (e.g., backscattering and local reflections) that may make the OTDR trace more challenging to analyze.

Figure 5B:
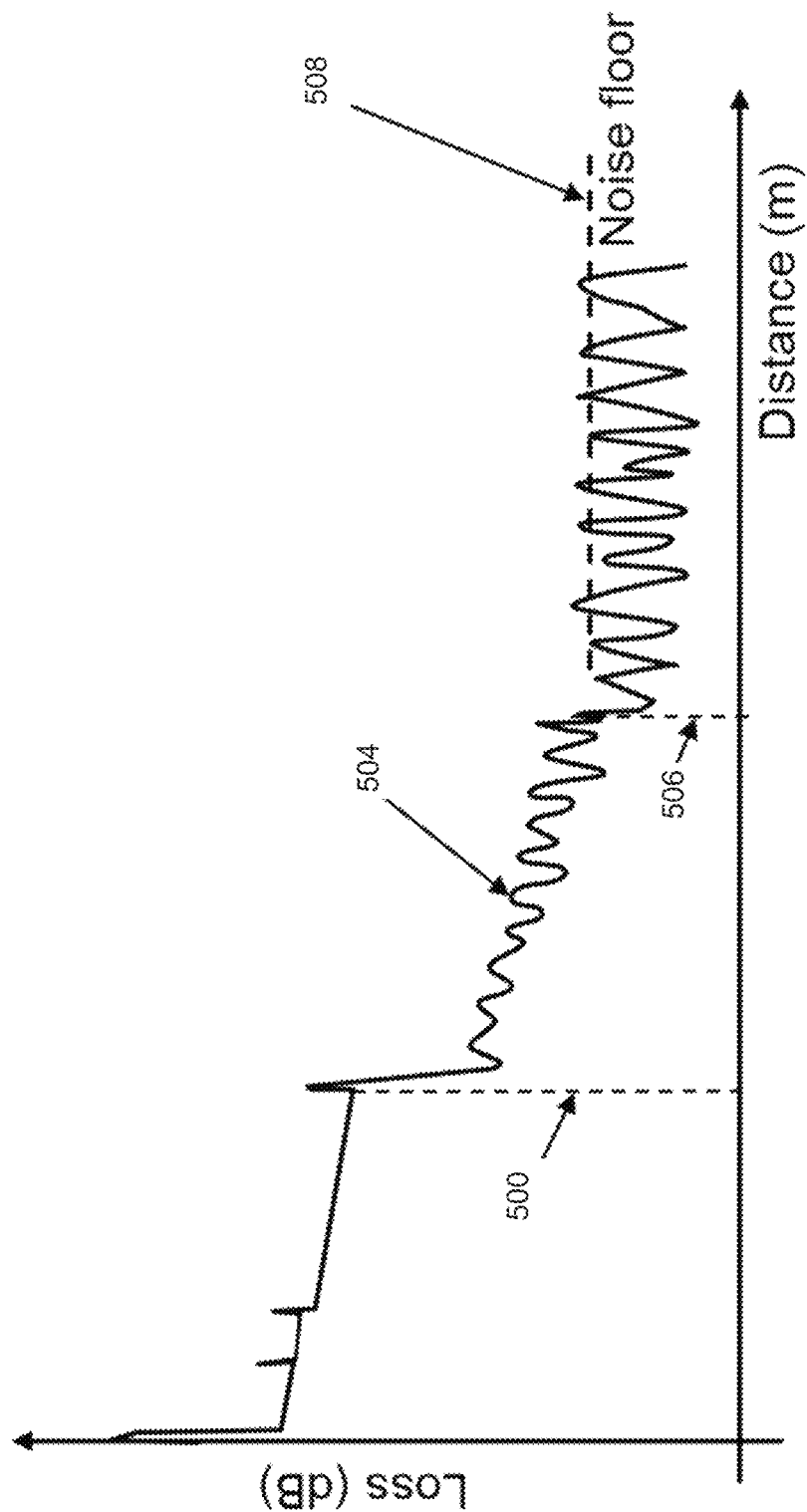
FIG. 5B illustrates a reflectometric trace obtained under more unfavorable measurement conditions with limited OTDR dynamic range, according to an example of the present disclosure.

FIG. 5B illustrates a reflectometric trace obtained under more unfavorable measurement conditions with limited OTDR dynamic range, according to an example of the present disclosure. Referring to FIG. 5B, the Rayleigh backscatter level after coupler 504 may be challenging to measure because of the relatively high noisiness. Under these signal-to-noise conditions, the location of the position of the ONT 506, the insertion loss of the splitter, as well as the link budget to the location of the ONT 506 may be challenging to accurately measure. Irrespective of the noise definition that is used, the dynamic range may define an attenuation loss between two levels on the OTDR trace (e.g., from maximum signal level to noise floor level). The closer the signal is to the noise floor, the noisier it becomes. In the example of FIG. 5B, a minimum margin is not utilized between the floor noise level and the local level. For example, a margin of 6 to 7 dB may be needed to obtain a noise on the order of 0.1 dB superimposed on the trace. When testing a PON network, the presence of a splitter with a high splitting rate may require a high dynamic range without leaving the possibility of increasing the latter by increasing the pulse width (thus still needing low dead zones). In FIG. 5B, 508 refers to the OTDR noise floor which corresponds to the part of the trace which follows the signal returned by the optical link, therefore only the noise. There are different ways to calculate the noise floor, either aligned with the peak value of the noise or a more complex calculation which corresponds to a slightly lower level calculated by taking 98% of the measurement points.

Figure 5C:
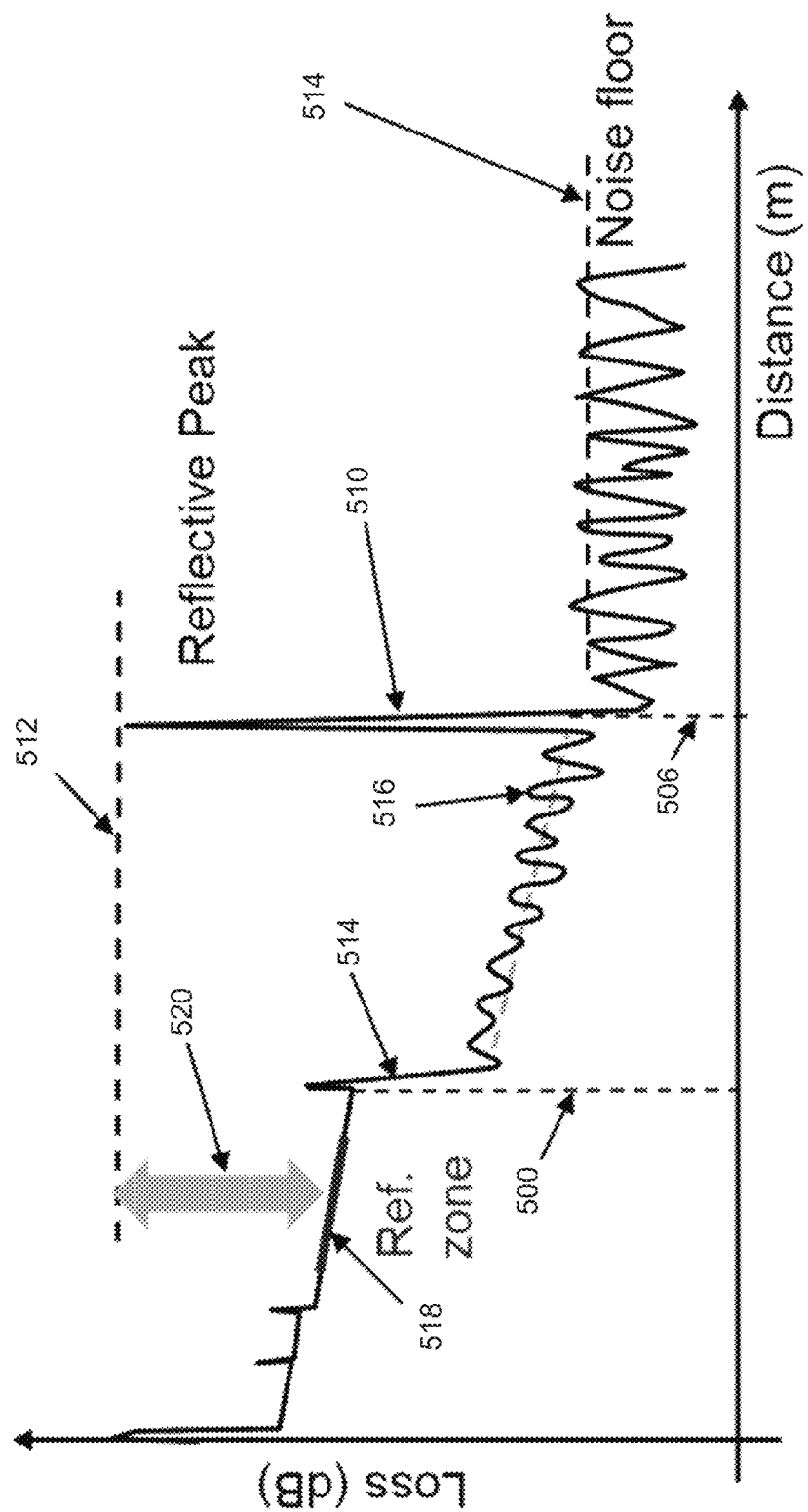
FIG. 5C illustrates an OTDR trace in a case where a reflector is placed just before the Optical Network Terminal (ONT), according to an example of the present disclosure.

FIG. 5C represents an OTDR trace in a case where a reflector is placed just before the ONT. This calibrated reflector may generate a reflective peak 510 which is very visible and identifiable because the peak amplitude 512 is well above noise floor 514. The measurement of the backscatter level may not be carried out directly on the noisy trace 516, but indirectly from the peak amplitude 512 corresponding to the top of the reflective peak 510. The location in distance of the ONT 506 may be based on the location of the marker associated with the ONT 506. The link budget may be determined by taking a reference level at a point or on an area 518 located upstream of the optical splitter location 500, and the value corresponds to the top of the reflective peak (e.g., peak amplitude 512). The difference 520 between the level taken on the reference zone (e.g., area 518) and the reflective peak level may not give direct access to budget loss. This is possible with the knowledge of the amplitude of the reflective peak above the level of backscattering at its foot, or in other words, with the use of a reflector calibrated in reflection or of known reflectance. These reflectors or optical markers may be implemented in removable pluggable versions to be installed subsequently, or to move them along the network during construction thereof. Different technologies can be used, such as fiber Bragg grating (FBG) markers or, for example, using a thin-film filter (TFF) deposited on a connector of a patch cord or another connectable device.

Figure 6:
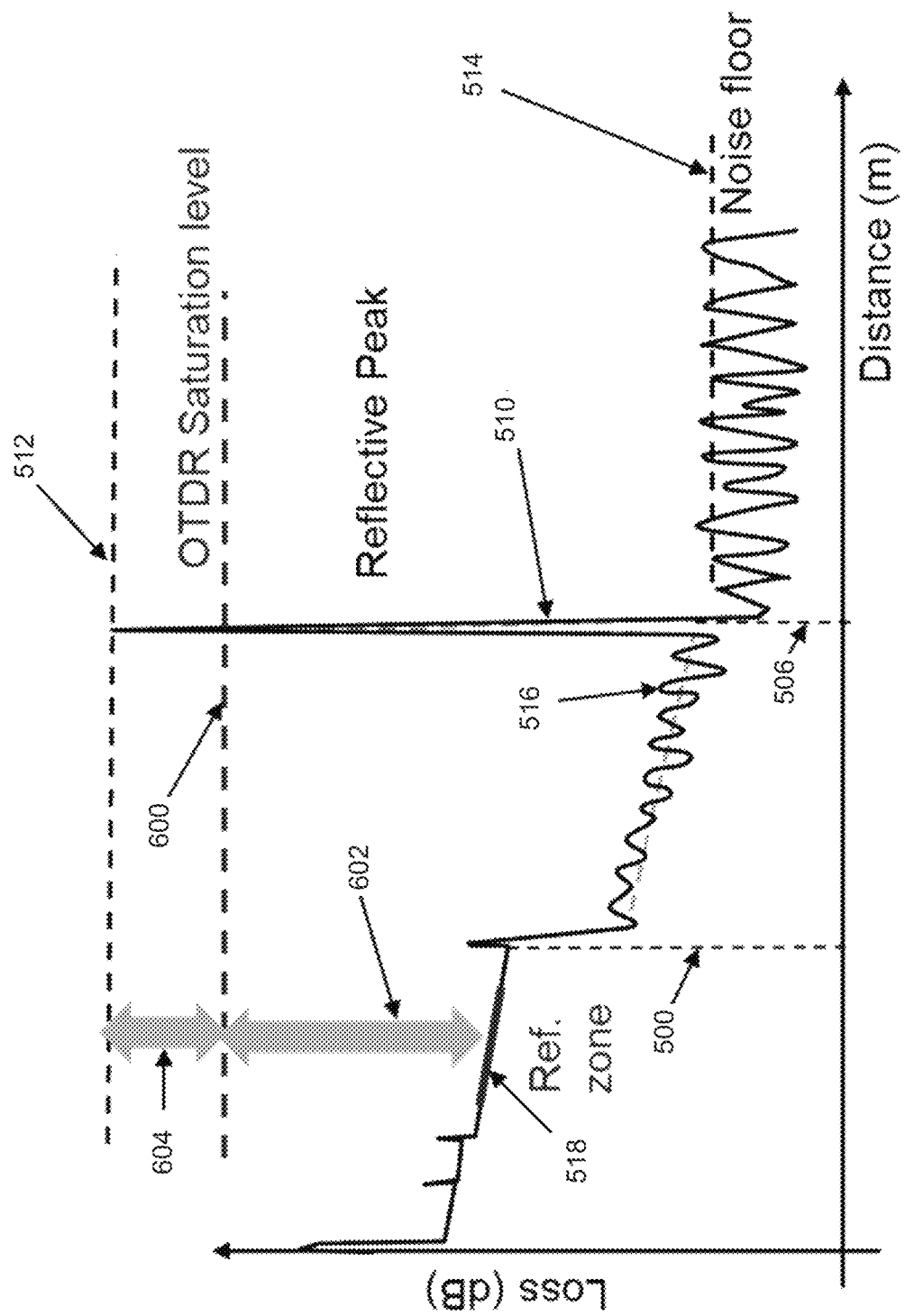
FIG. 6 illustrates a reflective peak generated by a marker having an amplitude such that the reflective peak exceeds a saturation level of an input of an OTDR, according to an example of the present disclosure.

FIG. 6 illustrates a reflective peak generated by a marker having an amplitude such that the reflective peak exceeds a saturation level of an input of an OTDR, according to an example of the present disclosure.

In certain cases such as that described in FIG. 6, the reflective peak generated by the marker has a peak amplitude 512 such that it exceeds the saturation level 600 of the input of the OTDR. Thus the amplitude of the signal measured by the OTDR on the reflective peak is far from the peak amplitude 512. The difference between the amplitude of the signal on the reference zone and that measured at the reflection peak 602 may be underestimated by a deviation 604 linked to the saturation of the OTDR. Using a less reflective reflector may correct the underestimate. In order to account for the different cases, a set of reflectors may be needed for displaying different reflectances. It may also be beneficial to know a priori which of the reflectors are placed according to the level of signal to local noise. Otherwise, several attempts may need to be made by trying different reflectors. The case of the OTDR step-by-step test, during the construction of a PON network, may also be technically challenging because the optical losses increase when moving away from the connection point of the OTDR, thus potentially requiring the use of fewer reflective markers. The systems and methods disclosed herein overcomes the aforementioned technical challenges with respect to the use of this measurement technique by using optical reflectors. In the case of FIG. 5C, the reflectance of the reflector may be correctly selected because it is of sufficient amplitude to allow the OTDR to make a correct measurement without reaching the OTDR saturation level. For FIG. 6 (described in further detail below), the reflectance value is too high and therefore inappropriate because it generates a reflection signal exceeding the input linear zone of the OTDR.

In one example, the systems and methods disclosed herein may include performing a second OTDR acquisition by attenuating the signal by a known value, either using an optical attenuator or by reducing the power emitted by the OTDR. In one example, an additional insertion loss may occur due to the adjustment of the variable optical attenuation in order to avoid saturation zone. In another example, the reduction in power of the OTDR may have an impact on performances, for example for the stability of the emitted power, the wavelength or the dependence of the power over the temperature range, as well as on the complexity of the OTDR design.

Figure 7:
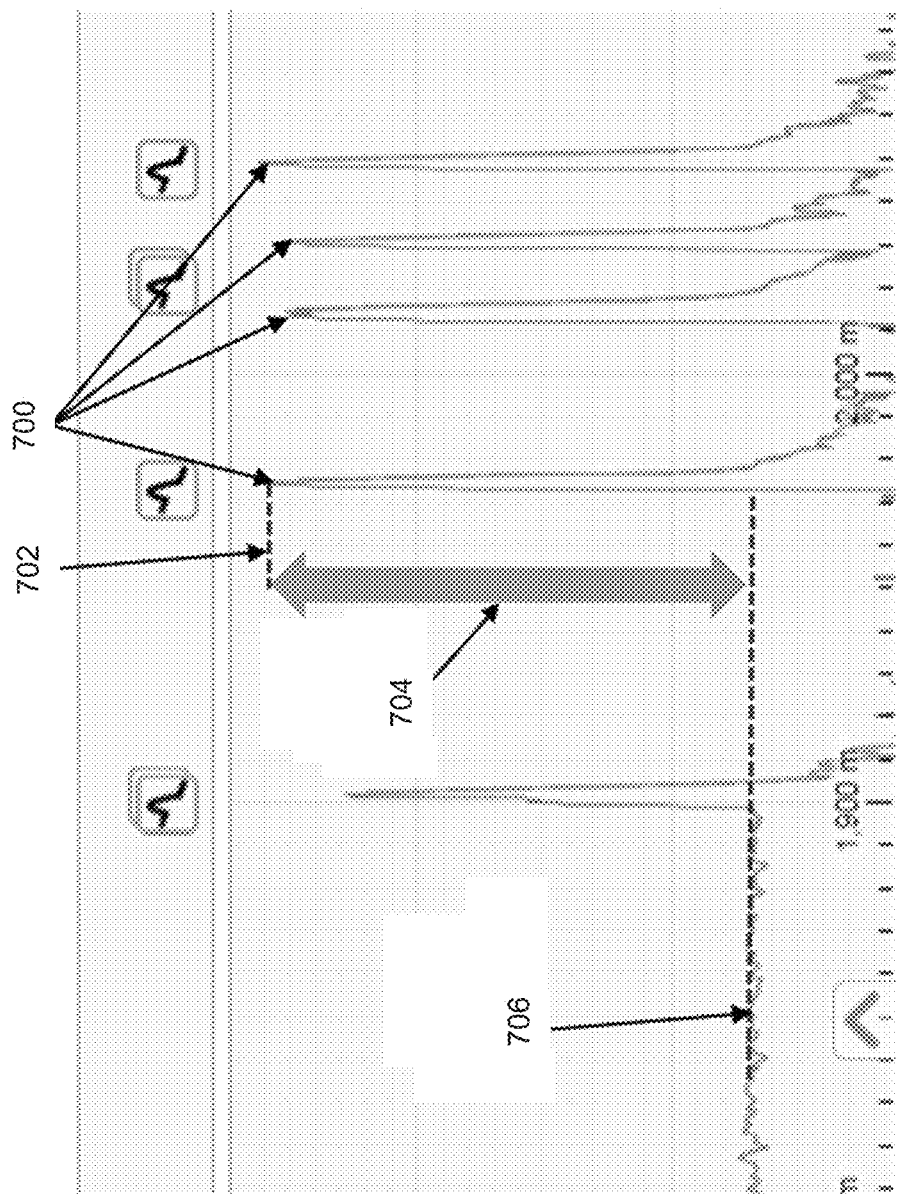
FIG. 7 illustrates a plurality of reflective peaks emerging from noise, according to an example of the present disclosure.

As disclosed herein, FIG. 6 is a simplified representation that illustrates a reflective peak generated by a marker having an amplitude such that the reflective peak exceeds a saturation level of an input of an OTDR. In actuality, the contributions of each branch downstream of the couplers may need to be taken into account. In this regard, FIG. 7 provides an example where several reflective peaks 700 emerge from the noise. Each peak may be characterized on its peak level 702 and its deviation 704 from a reference level 706.

Figure 8:
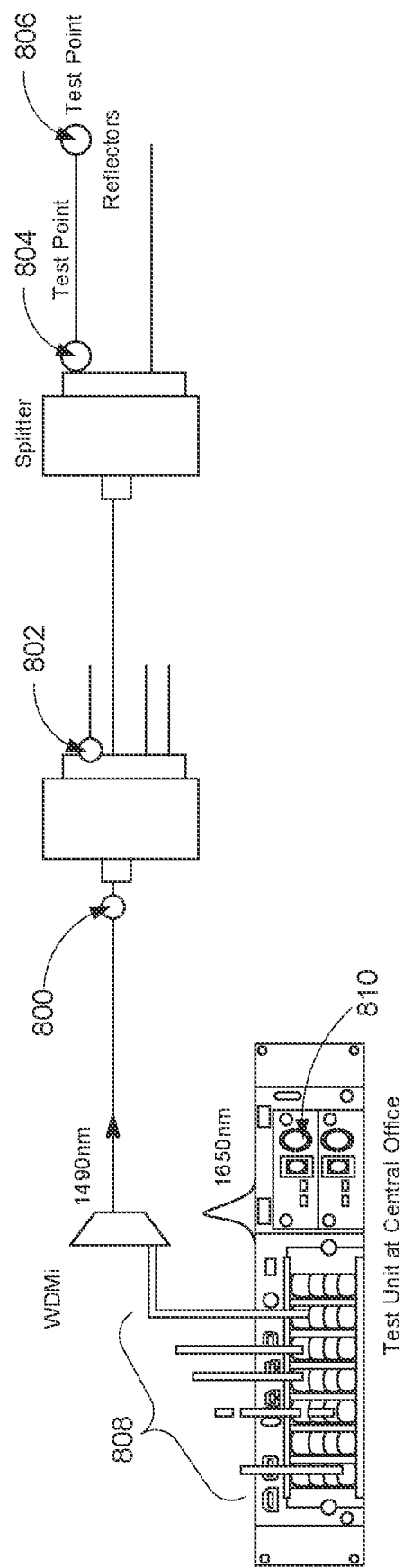
FIG. 8 illustrates building of a PON network, according to an example of the present disclosure.

FIG. 8 illustrates building of a PON network, according to an example of the present disclosure.

Referring to FIG. 8, FIG. 8 shows an example of implementation of the systems and methods disclosed herein when building a PON network. The reflectors may be moved to measure the feeder cable at point 800 (e.g., for feeder test), then the insertion loss of the first coupler at point 802 (e.g., splitter test), then the insertion loss of the second coupler at point 804, and finally the insertion loss of the connection cable to the ONT at point 806. The OTDR may continue to monitor other PON networks with the different outputs of an optical switch. For FIG. 8, 808 represents the different outputs of the 1 by N optical switch which allows OTDR 810 to be sequentially connected to N different optical networks.

Based on the operational principles disclosed herein with reference to FIGS. 4-8, operation of the systems and methods disclosed herein is described with reference to FIGS. 1-3B.

FIG. 1A illustrates an architecture of an OTDR-based high reflective event measurement system (hereinafter referred to as "system 100"), according to an example of the present disclosure. Referring to FIG. 1A, the system 100 may include an OTDR 102, and an N by M optical switch 104 optically connected to the OTDR 102 or disposed within the OTDR 102. The optical switch 104 may include a variable attenuator mode and at least one optical fiber (e.g., optical fibers 106A to 106N) connected to at least one output port of the optical switch 104. At least one fiber optic reflector (e.g., 108A to 108N) may be disposed at an end of the at least one optical fiber. A variable optical attenuator (VOA) 110 may reduce, for the at least one optical fiber including the at least one fiber optic reflector, an amplitude of reflective peaks. The VOA 110 may place the optical switch 104 in variable attenuator mode, which may otherwise be placed in switch mode.

FIGS. 1B-1F illustrate further examples of the architecture of the OTDR-based high reflective event measurement system of FIG. 1A, according to an example of the present disclosure.

Figure 1B:
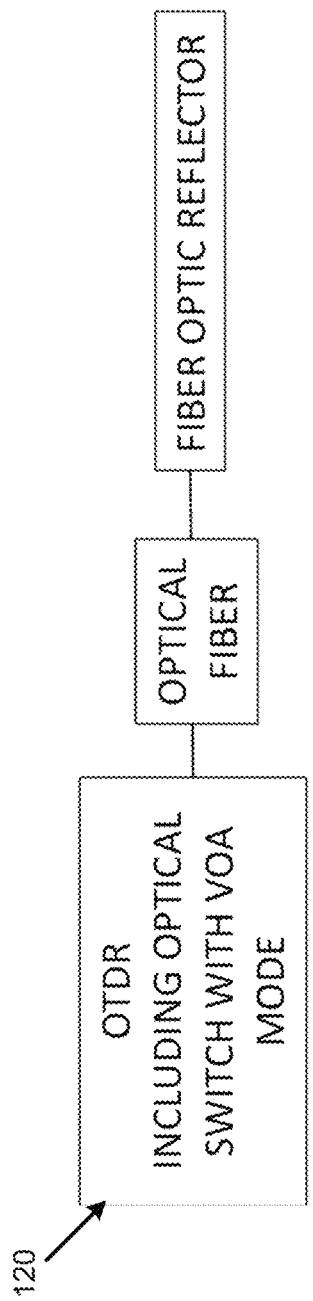
FIGS. 1B-1F illustrate further examples of the architecture of the OTDR-based high reflective event measurement system of FIG. 1A, according to an example of the present disclosure.

In the example of FIG. 1B, the OTDR 102 (denoted OTDR 120) may include the optical switch 104, and is connected to an optical fiber including a fiber optic reflector. Thus, the OTDR 102 may be connected to one optical fiber ended by the fiber optic reflector.

Figure 1C:
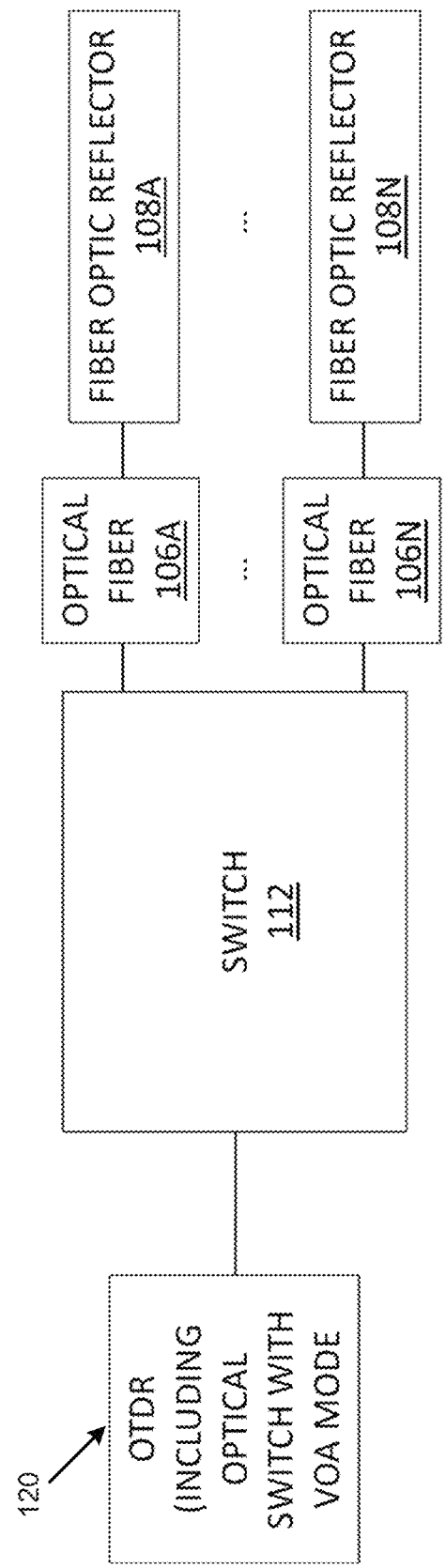

In the example of FIG. 1C, the OTDR 102 (denoted OTDR 120) may include the optical switch 104. Another switch 112 may be connected to at least one optical fiber (e.g., optical fibers 106A to 106N), which may include at least one fiber optic reflector (e.g., 108A to 108N) disposed at an end thereof. The switch 112 may monitor the at least one optical fiber (e.g., optical fibers 106A to 106N). Thus, as also disclosed herein with reference to FIG. 4, the switch 104 with VOA mode may be disposed inside the OTDR and is connected to external switch 112 of which multiple outputs are connected to optical fibers ended by reflectors.

Figure 1D:
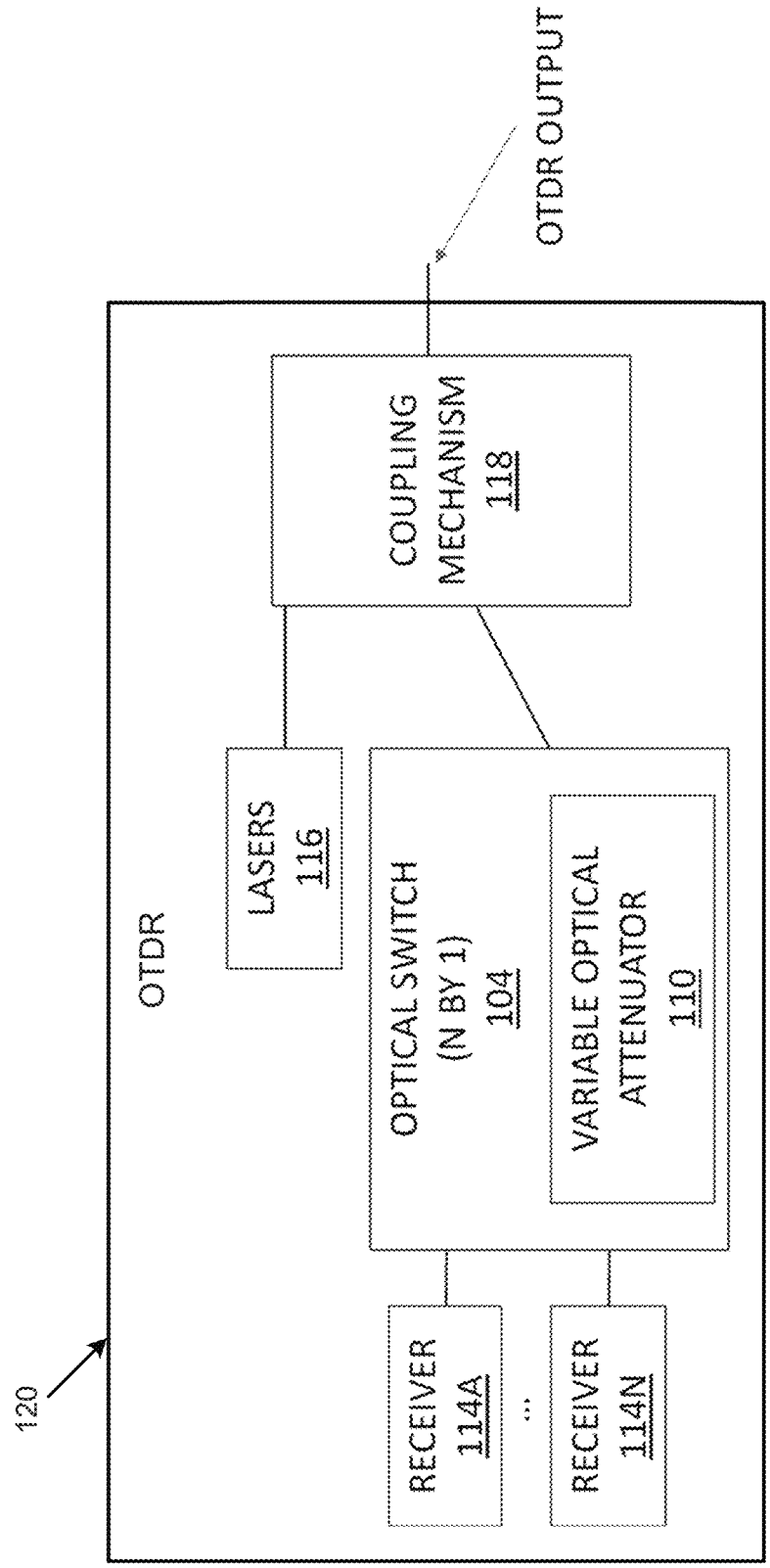

In the example of FIG. 1D, the OTDR (e.g., of FIG. 1C) may utilize an N by 1 optical switch 104. Coupling mechanism 118 (e.g., optical couplers or circulators) may be used to send laser light from lasers 116 to OTDR output. Reflected light coming from the OTDR output may be sent to the N by 1 optical switch 104 with VOA mode connected to multiple receivers (e.g., receivers 114A to 114N).

Figure 1E:
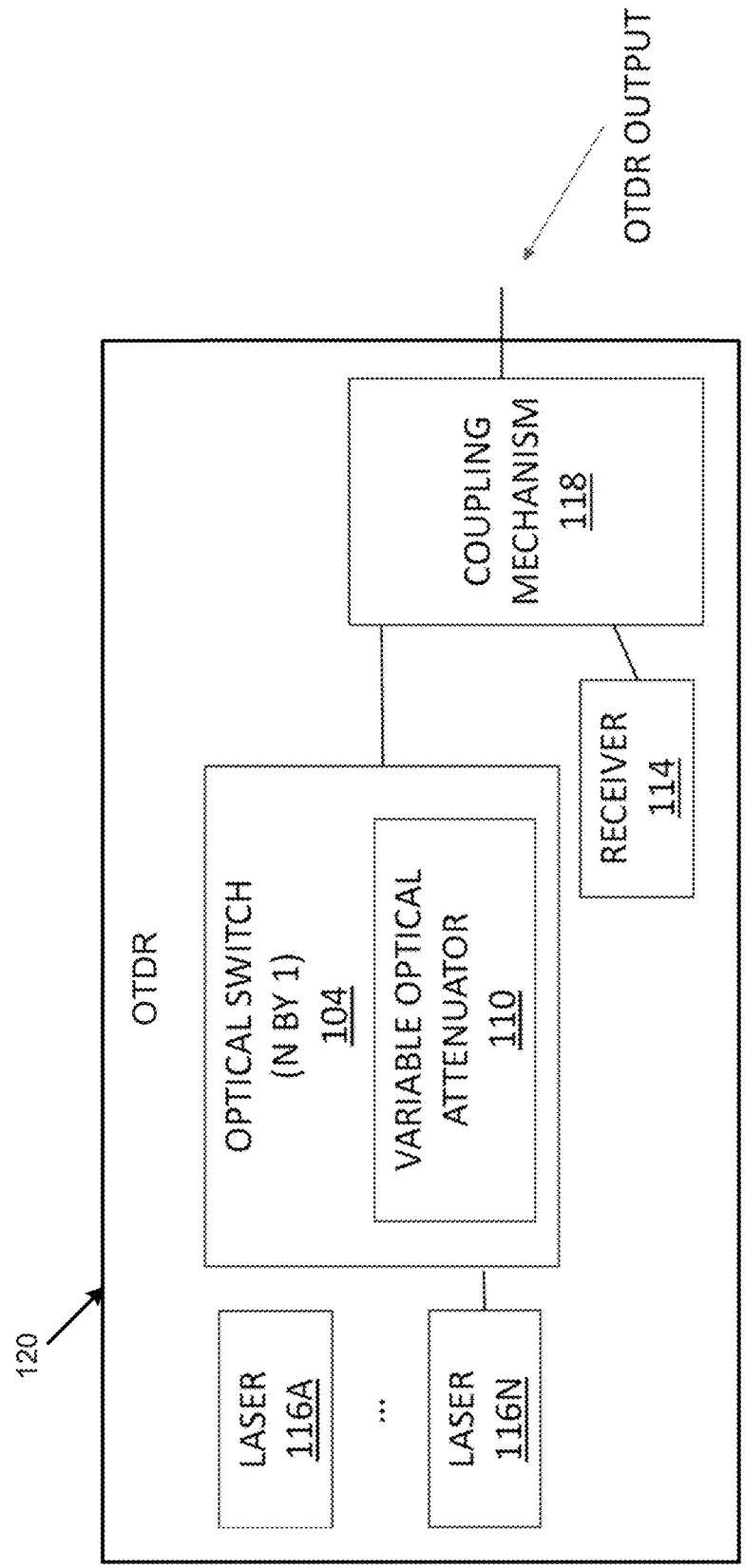

In the example of FIG. 1E, compared to FIG. 1D, the N by 1 optical switch 104 may be disposed between N lasers (e.g., lasers 116A to 116N), and the coupling mechanism 118.

Figure 1F:
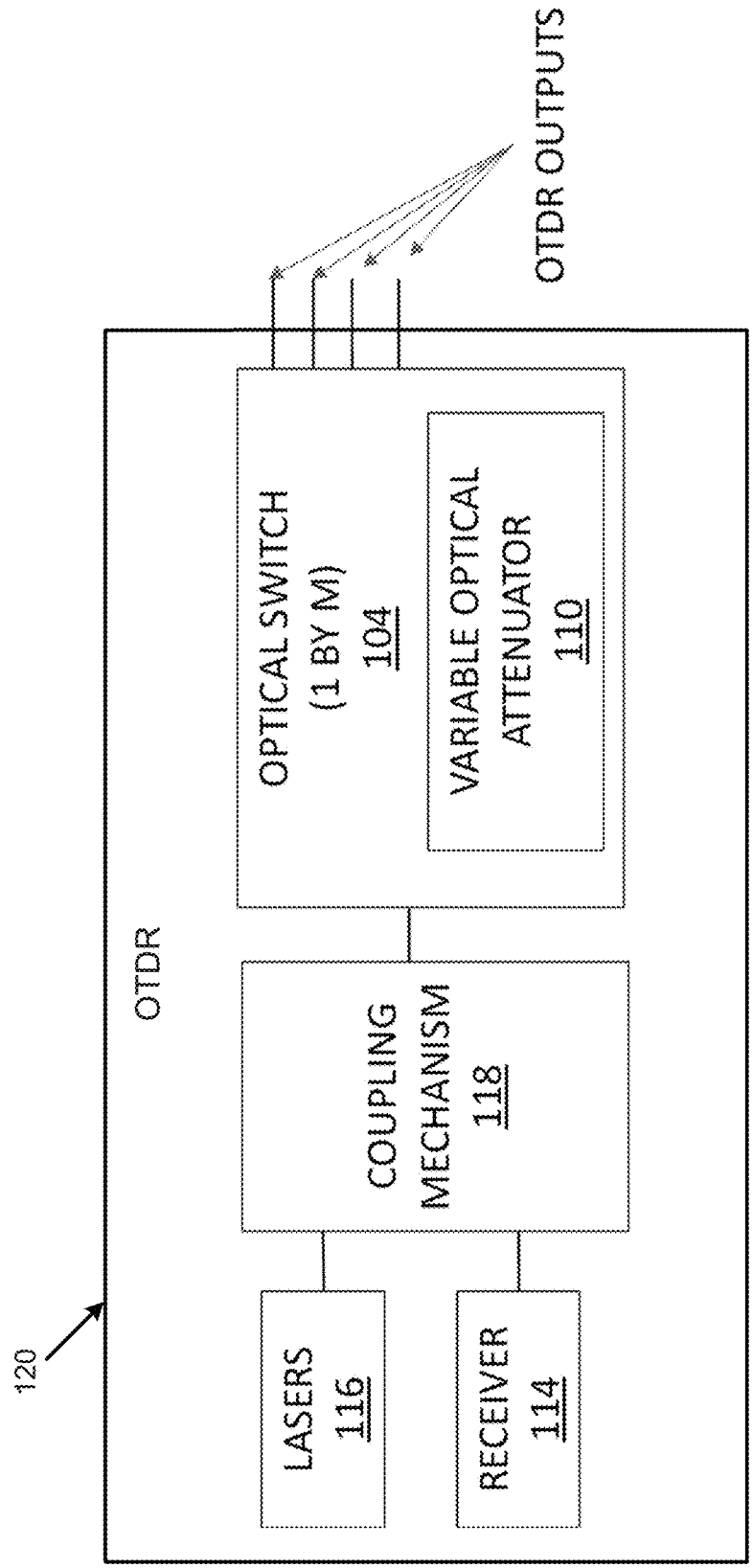

In the example of FIG. 1F, the optical switch 104 may include a 1 by M switch between the coupling mechanism 118 and M fiber outputs.

Figure 2:
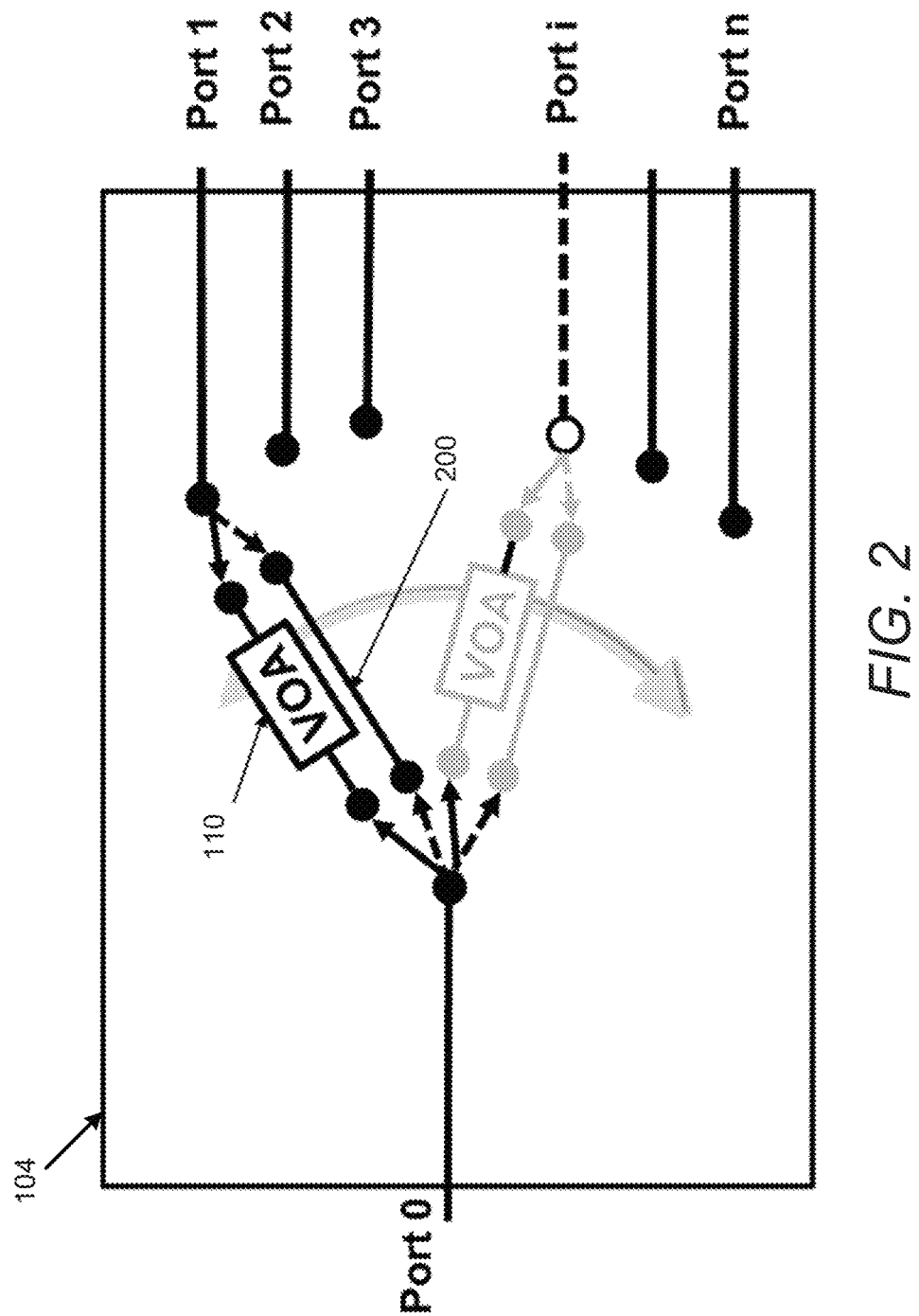
FIG. 2 illustrates a parallel configuration associated with an optical switch of the OTDR-based high reflective event measurement system of FIG. 1, according to an example of the present disclosure.

FIG. 2 illustrates a parallel configuration associated with the optical switch of the system 100, according to an example of the present disclosure.

Referring to FIG. 2, a parallel configuration may make it possible to have either a direct passage 200 or a passage via the VOA 110. This configuration may add additional insertion losses on both channels, and also include a VOA and additional optical switches.

Figure 3B:
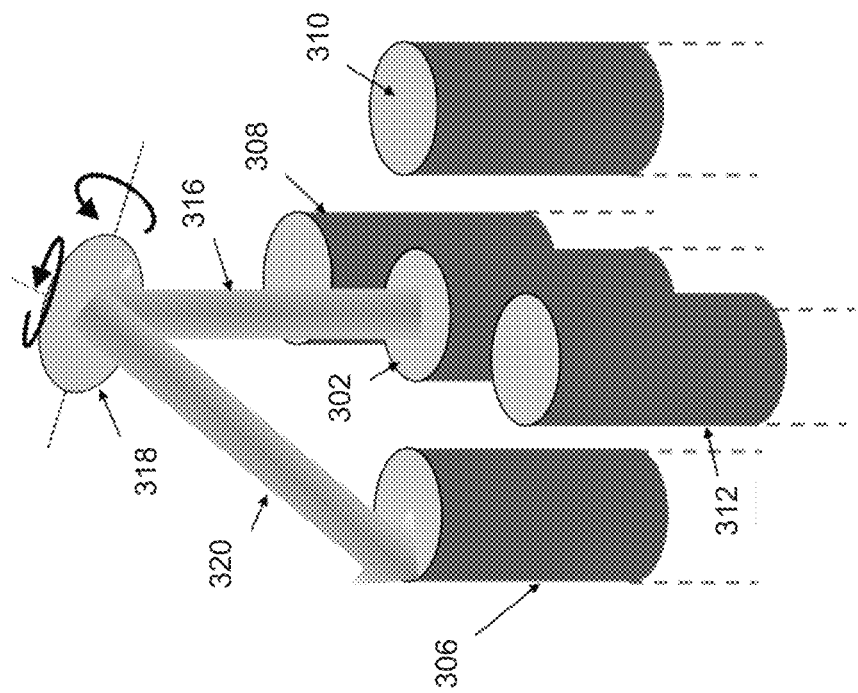
FIG. 3B illustrates a variable optical attenuation (VOA) mode associated with the OTDR-based high reflective event measurement system of FIG. 1A, according to an example of the present disclosure.
Figure 3A:
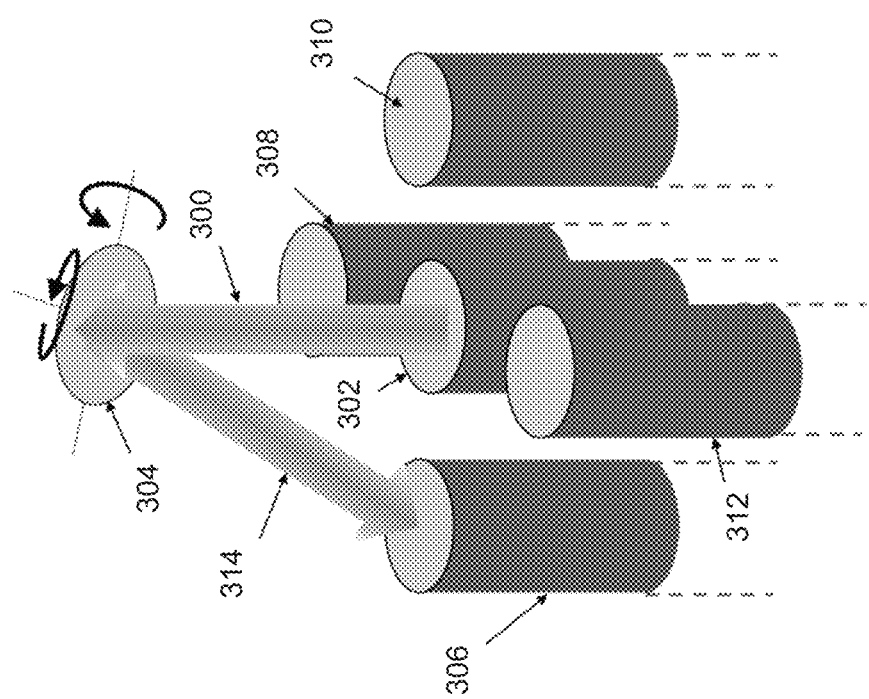
FIG. 3A illustrates an optical switch mode associated with the OTDR-based high reflective event measurement system of FIG. 1A, according to an example of the present disclosure.

FIG. 3A illustrates an optical switch mode associated with the system 100, according to an example of the present disclosure. FIG. 3B illustrates a variable optical attenuation (VOA) mode associated with the system 100, according to an example of the present disclosure.

The examples of FIGS. 3A and 3B include using the optical switch in optical attenuator mode. For example, FIGS. 3A and 3B show an implementation using MEMS (Micro Electro Mechanical Systems) technology. In this regard, FIG. 3A shows an optical switch mode. The optical beam 300 coming from the optical fiber 302 of the common port of the switch may be reflected by the mobile mirror 304 towards one of the four output optical fibers (306, 308, 310, or 312). For example, the optical beam 314 may be directed towards the optical fiber 306. In this optical switch mode, the orientation of the mirror 304 may be calibrated to minimize the insertion losses and maximize the optical coupling between the optical fiber 302 of the common port and the optical fiber 306 of the output port.

Referring to FIG. 3B, FIG. 3B shows the same 1 to 4 optical fibers (e.g., 306, 308, 310, and 312) in VOA mode. In this mode, the mobile mirror may be activated so that the beam deviates from its optimal position. Thus, the optical beam 316 originating from the optical fiber 302 may be reflected by the optical mirror 318 with a slight deviation from its calibrated position. Under these conditions, the reflected beam 320 is off-center with respect to the axis of the optical fiber 306, not allowing optimal optical coupling between the optical fiber 302 of the common port and the output optical fiber 306. Thus, by adjusting the position of the mirror 318, it is possible to adjust the insertion loss and thus realize a VOA function.

The system 100 may thus account for OTDR reflectors using the aforementioned principles to generate calibrated attenuation or a direct mode for any output of the optical switch using MEMS technology. In optical switch mode, insertion losses may be minimized to maximize the dynamic potential of the OTDR, as well as to measure non-saturating reflection peaks. In variable attenuator mode, the marker reflection signal may be sufficiently attenuated to exit the saturation zone. The VOA mode may be calibrated for different predefined optical insertion losses, and if necessary at different wavelengths.

The system 100 may be applied as a 1-by-N, and/or matrix switches, N-by-N, or N-by-M. In a 2-by-1 configuration, the system 100 may be used to switch two OTDR lasers and regulate or adjust their optical power coupled into an optical fiber. Likewise, the system 100 may be used to switch an OTDR signal received from the optical fiber under test, and between two photodiodes with the possibility of attenuating the signal.

Figure 9:
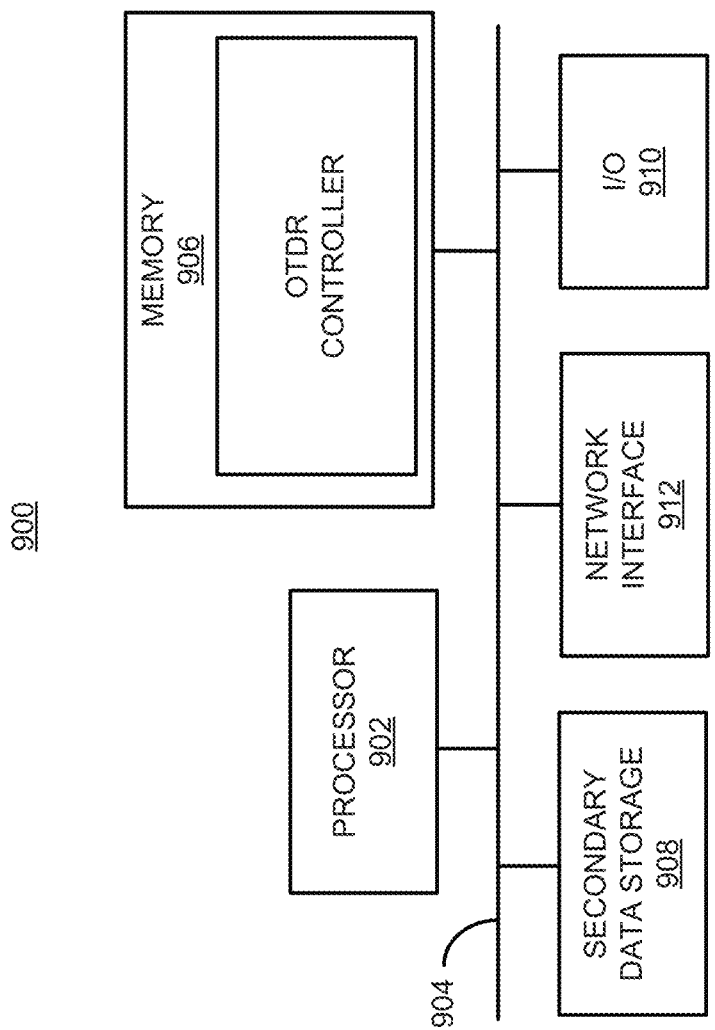
FIG. 9 illustrates a computer system, according to an example of the present disclosure.

FIG. 9 shows a computer system 900 that may be used with the examples described herein. The computer system may represent a generic platform that includes components that may be in a server or another computer system. The computer system 900 may be used as part of a platform for a controller of the system 100. The computer system 900 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 900 may include a processor 902 that may implement or execute machine readable instructions performing some or all of the methods, functions and other processes described herein. Commands and data from the processor 902 may be communicated over a communication bus 904. The computer system may also include a main memory 906, such as a random access memory (RAM), where the machine readable instructions and data for the processor 902 may reside during runtime, and a secondary data storage 908, which may be non-volatile and stores machine readable instructions and data. The memory and data storage are examples of computer readable mediums. The memory 906 may include the controller of the system 100 including machine readable instructions residing in the memory 906 during runtime and executed by the processor 902.

The computer system 900 may include an I/O device 910, such as a keyboard, a mouse, a display, etc. The computer system may include a network interface 912 for connecting to a network. Other known electronic components may be added or substituted in the computer system.

The processor 902 may be designated as a hardware processor. The processor 902 may execute operations associated with various components of the OTDR-based high reflective event measurement system 100. For example, the processor 902 may execute operations associated with the controller of the system 100, etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An optical time-domain reflectometer (OTDR)-based high reflective event measurement system comprising:
   an OTDR;
   an N by M optical switch optically connected to the OTDR or disposed within the OTDR, wherein the optical switch includes a variable optical attenuator to place the optical switch in a variable attenuator mode and at least one optical fiber connected to at least one output port of the optical switch; and
   at least one fiber optic reflector disposed at an end of the at least one optical fiber;
   wherein the variable optical attenuator reduces, for the at least one optical fiber including the at least one fiber optic reflector, an amplitude of reflective peaks.

2. The OTDR-based high reflective event measurement system according to claim 1, wherein the optical switch is based on micro-electromechanical systems (MEMS) technology, or wherein the optical switch is based on electro-mechanical technology.

3. The OTDR-based high reflective event measurement system according to claim 1, wherein for the N by M optical switch, N is one.

4. The OTDR-based high reflective event measurement system according to claim 1, wherein for the N by M optical switch, M is one.

5. The OTDR-based high reflective event measurement system according to claim 1, wherein for the N by M optical switch, N and M are greater than one.

6. The OTDR-based high reflective event measurement system according to claim 1, wherein a network under test by the OTDR-based high reflective event measurement system includes a passive optical network (PON).

7. The OTDR-based high reflective event measurement system according to claim 1, wherein a network under test by the OTDR-based high reflective event measurement system includes a point to point fiber optic network.

8. The OTDR-based high reflective event measurement system according to claim 1, further comprising:
   a tap photodiode to monitor optical power at output ports of the optical switch.

9. The OTDR-based high reflective event measurement system according to claim 1, wherein the optical switch includes mirrors and the variable attenuator mode is implemented by misaligning the mirrors at the at least one output port.

10. A method for optical time-domain reflectometer (OTDR)-based high reflective event measurement, the method comprising:
    optically connecting an N by M optical switch to an OTDR, wherein the optical switch includes a variable optical attenuator to place the optical switch in a variable attenuator mode and at least one optical fiber connected to at least one output port of the optical switch;
    optically connecting at least one fiber optic reflector at an end of the at least one optical fiber; and
    reducing, by the variable optical attenuator, for the at least one optical fiber including the at least one fiber optic reflector, an amplitude of reflective peaks.

11. The method according to claim 10, wherein the optical switch is based on micro-electromechanical systems (MEMS) technology.

12. The method according to claim 10, wherein the optical switch is based on electro-mechanical technology.

13. The method according to claim 10, wherein for the N by M optical switch, N is one.

14. The method according to claim 10, wherein for the N by M optical switch, M is one.

15. The method according to claim 10, wherein for the N by M optical switch, N and M are greater than one.

16. The method according to claim 10, further comprising:
    testing, by the OTDR, a network under test that includes a passive optical network (PON).

17. The method according to claim 10, further comprising:
    testing, by the OTDR, a network under test that includes a point to point fiber optic network.

18. The method according to claim 10, further comprising:
    monitoring, by a tap photodiode, optical power at output ports of the optical switch.

19. An optical time-domain reflectometer (OTDR)-based high reflective event measurement system comprising:
    an OTDR including an N by M optical switch, wherein the optical switch includes a variable optical attenuator to place the optical switch in a variable attenuator mode and at least one optical fiber connected to at least one output port of the optical switch; and
    at least one fiber optic reflector disposed at an end of the at least one optical fiber;
    wherein the variable optical attenuator reduces, for the at least one optical fiber including the at least one fiber optic reflector, an amplitude of reflective peaks.

20. The OTDR-based high reflective event measurement system according to claim 19, wherein for the N by M optical switch, N is at least one, and M is at least one.

* * * * *

UNITED STATES PATENT AND TRADEMARK OFFICE
CERTIFICATE OF CORRECTION

| | | |
|---|---|---|
| PATENT NO. | : 11,646,789 B2 | Page 1 of 1 |
| APPLICATION NO. | : 17/580430 | |
| DATED | : May 9, 2023 | |
| INVENTOR(S) | : Benjamin Cuenot | |

It is certified that error appears in the above-identified patent and that said Letters Patent is hereby corrected as shown below:

On the Title Page

Foreign Application Priority Data is missing.
Please add Item (30), Foreign Application Priority Data:
Sep. 3, 2021 (EP) .........................21306206.0

Signed and Sealed this
Fourth Day of June, 2024

Katherine Kelly Vidal
*Director of the United States Patent and Trademark Office*